United States Patent
Aoki et al.

(10) Patent No.: US 8,440,305 B2
(45) Date of Patent: May 14, 2013

(54) ELECTRICALLY CONDUCTIVE SHEET

(75) Inventors: Yutaka Aoki, Isezaki (JP); Takeshi Miyakawa, Isezaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 388 days.

(21) Appl. No.: 12/303,754

(22) PCT Filed: Aug. 7, 2007

(86) PCT No.: PCT/JP2007/065466
§ 371 (c)(1),
(2), (4) Date: Dec. 8, 2008

(87) PCT Pub. No.: WO2008/018473
PCT Pub. Date: Feb. 14, 2008

(65) Prior Publication Data
US 2010/0196719 A1    Aug. 5, 2010

(30) Foreign Application Priority Data
Aug. 10, 2006   (JP) .................................. 2006-218418

(51) Int. Cl.
*B32B 9/04*    (2006.01)
*B32B 27/36*   (2006.01)
*B32B 5/16*    (2006.01)
*B32B 27/06*   (2006.01)

(52) U.S. Cl.
USPC ......... 428/411.1; 428/412; 428/323; 428/480

(58) Field of Classification Search .................. None
See application file for complete search history.

(56) References Cited

U.S. PATENT DOCUMENTS

2002/0176991 A1* 11/2002 Jackson et al. ............. 428/411.1
2004/0005465 A1* 1/2004 Oda et al. .................... 428/422

FOREIGN PATENT DOCUMENTS

| JP | 57-205145 | | 12/1982 |
| JP | 62-18261 | | 1/1987 |
| JP | 9 123359 | | 5/1997 |
| JP | 10 29287 | | 2/1998 |
| JP | 2002-67258 | | 3/2002 |
| JP | 2003-512207 | | 4/2003 |
| JP | 2004-185928 | | 7/2004 |
| JP | 2005170514 | * | 6/2005 |
| JP | 2005-355397 A | * | 8/2005 |
| JP | 2005 297504 | | 10/2005 |
| JP | 2005-297504 A | * | 10/2005 |
| JP | 2005 335397 | | 12/2005 |
| JP | 2006 27266 | | 2/2006 |

OTHER PUBLICATIONS

Ishii et al., JP 2005-297504—machine translation, Oct. 27, 2005.*
Miyagawa, JP2005-335397—machine translation, Aug. 12, 2005.*
JP 2005-297504—translation by Schreiber Translation, Inc. Oct. 27, 2005.*
Kosugi et al., JP2005170514 machine translation, Jun. 30, 2005.*
Ishii et al., JP 2005-297504 human translation, Oct. 27, 2005.*

* cited by examiner

*Primary Examiner* — Callie Shosho
*Assistant Examiner* — Coris Fung
(74) *Attorney, Agent, or Firm* — Oblon, Spivak, McClelland, Maier & Neustadt, L.L.P.

(57) ABSTRACT

A sheet which has a substrate layer containing from 21 to 87 mass % of a polycarbonate resin, from 7 to 68 mass % of a polyalkylene terephthalate resin and from 3 to 30 mass % of carbon black, and a surface layer containing from 19 to 86 mass % of a polycarbonate resin, from 6 to 67 mass % of a polyalkylene terephthalate resin and from 5 to 35 mass % of carbon black, laminated on one side or both sides of the substrate layer by extrusion, co-extrusion or extrusion coating, where the sheet has a burr incidence ratio of at most 4%, and a carrier tape using the sheet.

20 Claims, No Drawings

ELECTRICALLY CONDUCTIVE SHEET

CROSS REFERENCE TO RELATED APPLICATION

This application is a 371 of PCT/JP07/065,466, filed on Aug. 7, 2007, and claims priority to Japanese Patent Application No. 2006-218418, filed on Aug. 10, 2006.

TECHNICAL FIELD

The present invention relates to an electrically conductive sheet which has mechanical strength capable of coping with high speed packaging and mounting of electronic components, and with which formation of burrs and sink marks at the time of blanking and slitting is remarkably reduced.

BACKGROUND ART

For packaging electronic components such as IC and electronic components using IC, an injection tray, a vacuum-formed tray, a magazine, a carrier tape (also called an embossed carrier tape), etc. are used. As such a packaging container, one having an electrically conductive filler dispersed in its surface is used to prevent electronic components such as IC from being destroyed by static electricity, and as the electrically conductive filler, carbon black is widely used, capable of providing a uniform and stable surface resistivity at a low cost.

An electrically conductive sheet comprising a thermoplastic resin having carbon black dispersed therein has such a problem that its mechanical strength and moldability tend to decrease. Patent Documents 1, 2 and the like have been proposed as a method to overcome such a problem. Further, as a sheet for a carrier tape having high mechanical strength and excellent in carbon releasability, Patent Documents 3 and 4 have been proposed. Further, Patent Document 5 has been proposed as a method of imparting easy moldability in various molding methods such as pressure forming, vacuum forming and press molding, and Patent Document 6 has been proposed as a method of improving slitting properties. However, as electronic components become complicated, precise and miniaturized, a packing material has a narrow sheet width and is miniaturized, and electronic components are packaged and mounted at an increasingly high rate. Therefore, a sheet having mechanical strength capable of coping therewith and having high moldability with which molding in a wide temperature range at a low temperature side in various molding methods is possible, has been desired. Further, a conventional carrier tape tends to have burrs and sink marks at the slit portion and the slit edge portion at perforations or center holes of pocket, and such a problem is apparent that they may adversely affect protection of electronic components as miniaturization of the components is in progress.

Patent Document 1: JP-A-57-205145
Patent Document 2: JP-A-62-18261
Patent Document 3: JP-A-2003-512207
Patent Document 4: JP-A-2002-67258
Patent Document 5: JP-A-2005-297504
Patent Document 6: JP-A-2004-185928

DISCLOSURE OF THE INVENTION

Object to be Accomplished by the Invention

The present invention is to provide an electrically conductive sheet, which has mechanical strength capable of coping with high speed packaging and mounting of electronic components, which can be molded in a wide temperature region at a lower temperature side by various molding methods, and with which a molding product having remarkably reduced degree of formation of burrs and sink marks at the time of blanking and slitting.

Means to Accomplish the Object

Namely, the present invention provides the following.
(1) A sheet which comprises a substrate layer containing from 21 to 87 mass % of a polycarbonate resin, from 7 to 68 mass % of a polyalkylene terephthalate resin and from 3 to 30 mass % of carbon black, and a surface layer containing from 19 to 86 mass % of a polycarbonate resin, from 6 to 67 mass % of a polyalkylene terephthalate resin and from 5 to 35 mass % of carbon black, laminated on one side or both sides of the substrate layer by extrusion, co-extrusion or extrusion coating, and which has a burr incidence ratio of at most 4%.
(2) The sheet according to the above (1), wherein the polyalkylene terephthalate resin is polybutylene terephthalate.
(3) The sheet according to the above (1) or (2), which has a tensile elongation at break of from 10 to 150% as stipulated in JIS K6734 (2000).
(4) The sheet according to any one of the above (1) to (3), wherein the surface layer has a surface resistivity of from $10^2$ to $10^{10} \Omega$.
(5) The sheet according to any one of the above (1) to (4), which is produced by a co-extrusion method using a multi-manifold die or a feed block.
(6) A carrier tape using the sheet as defined in any one of the above (1) to (5).

Effects of the Invention

The sheet of the present invention is suitable for high speed packaging and high speed mounting since it has excellent mechanical strength, and when a molded product is obtained from it, it can be molded in a wide temperature region at a lower temperature side by various molding methods. Further, it is suitable for an electric component package with high precision, since formation of dust at the time of blanking or the like is remarkably reduced, whereby electronic components as contents will not be contaminated with scraps at the time of processing.

BEST MODE FOR CARRYING OUT THE INVENTION

The polycarbonate resin for the substrate layer is one derived from a dihydroxy compound, preferably an aromatic dihydroxy compound, particularly preferably an aromatic dihydroxy compound (bisphenol) having two aromatic dihydroxy compounds bonded via a certain connecting group. The resin may be one produced by a known method and its production method is not limited, and a commercially available resin may be used.

The content of the polycarbonate resin in the substrate layer is from 21 to 87 mass %, preferably from 35 to 82 mass % when the total amount of the polycarbonate resin, the polyalkylene terephthalate resin and carbon black is 100 mass %. If it is less than 21 mass %, impact strength and mechanical strength tend to decrease, and if it exceeds 87 mass %, the molded temperature tends to be high.

The polyalkylene terephthalate resin for the substrate layer may be one obtained mainly from ethylene glycol or 1,4-butanediol as a glycol component and terephthalic acid or its dimethyl ether as a dicarboxylic acid component, and in addition, one having part of the copolymer monomer, i.e. the glycol component replaced with diethylene glycol, 1,4-tetramethylene glycol, 1,4-cyclohexane dimethanol or heptamethylene glycol, or the dicarboxylic acid component replaced with isophthalic acid, 1,5-naphthalene dicarboxylic acid or adipic acid, may be used. Preferred is a polyalkylene terephthalate resin having, as a glycol component, a 1,4-cyclohexane dimethanol component copolymerized in an amount of from 0.1 to 10 mol %, or a polyalkylene terephthalate resin having, as an acid component, an isophthalic acid component copolymerized in an amount of at least 1 mol % and at most 10 mol %, in view of moldability. It may, for example, be a polybutylene terephthalate resin (PET), a polybutylene terephthalate resin (PBT) or polytrimethylene terephthalate (PTT).

The content of the polyalkylene terephthalate resin in the substrate layer is from 7 to 68 mass %, preferably from 10 to 49 mass % when the total amount of the polycarbonate resin, the polyalkylene terephthalate resin and the carbon black is 100 mass %. If it less than 7 mass %, the molding temperature tends to be high, and if it exceeds 68 mass %, impact strength and mechanical strength tend to decrease.

Carbon black to be used for the substrate layer may, for example, be furnace black, channel black or acetylene black, and is preferably one having a small particle size and small directional properties. For example, acetylene black or Ketjenblack is preferred.

The content of the carbon black in the substrate layer is from 3 to 30 mass %, preferably from 10 to 25 mass % when the total amount of the polycarbonate resin, the polyalkylene terephthalate resin and carbon black is 100 mass %. If it is less than 3 mass %, it tends to be difficult to reduce formation of burrs and sink marks at the time of blanking, and if it exceeds 30 mass %, impact strength and mechanical strength tend to decrease.

For the substrate layer, it is possible to use various additives such as a lubricant, a plasticizer, a thermal stabilizer, a processing aid, an inorganic filler and a delustering agent as the case requires within a range not to impair properties required in the object of the present invention.

As the polycarbonate resin for the surface layer, the same polycarbonate resin as for the substrate layer may be used.

The content of the polycarbonate resin in the surface layer is from 19 to 86 mass %, preferably from 32 to 81 mass % when the total amount of the polycarbonate resin, the polyalkylene terephthalate resin and carbon black is 100 mass %. If it is less than 19 mass %, impact strength and mechanical strength tend to decrease, and if it exceeds 86 mass %, the molding temperature tends to be high.

As the polyalkylene terephthalate resin for the surface layer, the same polyalkylene terephthalate resin as for the substrate layer may be used.

The content of the polyalkylene terephthalate resin in the surface layer is from 6 to 67 mass %, preferably from 10 to 48 mass % when the total amount of the polycarbonate resin, the polyalkylene terephthalate resin and carbon black is 100 mass %. If it is less than 6 mass %, the molding temperature tends to be high, and if it exceeds 67 mass %, impact strength and mechanical strength tend to decrease.

Carbon black to be used for the surface layer may, for example, be furnace black, channel black or acetylene black, and preferred is one having a large specific surface area and capable of providing high electrical conductivity with a small addition amount to the resin. For example, acetylene black or Ketjenblack is preferred.

The content of carbon black in the surface layer is such an addition amount that a surface resistivity of from $10^2$ to $10^{10}\Omega$, preferably from $10^2$ to $10^6\Omega$ is achieved, and it is preferably from 5 to 35 mass %, more preferably from 10 to 25 mass % when the total amount of the polycarbonate resin, the polyalkylene terephthalate resin and carbon black is 100 mass %. If the addition amount is less than 5 mass %, no sufficient electrical conductivity will be obtained and the surface resistivity will increase, and if it exceeds 35 mass %, the uniform dispersibility with the resin will deteriorate, moldability will deteriorate, or physical properties such as mechanical strength will decrease. Further, if the surface resistivity exceeds $10^{10}\Omega$, no sufficient antistatic effect will be obtained, and if it is less than $10^2\Omega$, electricity will easily flow in from the outside by e.g. electrostatic electricity, and electronic components may be destroyed.

For the surface layer, various additives such as a lubricant, a plasticizer, a thermal stabilizer, a processing aid, an inorganic filler and a delustering agent may be used as the case requires with a range not to impair properties required in the object of the present invention.

By the tensile elongation at break of a sheet test specimen being from 10 to 150% by a measurement method as stipulated in JIS K6734 (2000), formation of burrs and sink marks in perforations or center holes can be suppressed. If it is at most 10%, the sheet tends to be too hard, whereby the sheet is likely to be cracked from the above portions at the time of blanking, and if it is 150% or above, the incidence ratio of burrs and sink marks tends to increase, whereby electronic components will remarkably be contaminated.

The burr incidence ratio is a value having the incidence frequency of burrs and sink marks formed in each of perforations and center holes of a molded embossed carrier tape, digitized by image processing. It is an index of the incidence frequency as a value determined by image processing, indicating how many percentage of a perfect circle covered with burrs or sink marks covering the perforations, assuming the incidence ratio of a perfect circle with no burrs or sink marks formed at all as 0%. The burr incidence ratio is preferably at most 4%, more preferably at most 3%. If the incidence ratio exceeds 4%, the amount of burrs or sink marks covering the perforations tends to be large, whereby electronic components will remarkably be contaminated.

The thickness of the entire sheet is usually from 0.1 to 3.0 mm, preferably from 0.1 to 1.5 mm, and the thickness of the surface layer in the thickness of the entire sheet is preferably from 2% to 80%, particularly preferably from 5 to 60%. If the thickness of the entire sheet is less than 0.1 mm, the sheet tends to have insufficient strength as a carrier tape, and if it exceeds 3.0 mm, molding such as pressure forming, vacuum forming or hot plate pressing tends to be difficult. Further, if the thickness of the surface layer is less than 2%, the surface resistivity of the carrier tape may be very high in some cases, whereby no sufficient static electricity suppressing effect will be obtained, and if it exceeds 80%, moldability in pressure forming, vacuum forming, hot plate pressing or the like may decrease in some cases.

The sheet can be produced by a known production method using an extruder, a calendering machine or the like from the resins used for the substrate layer and carbon black (hereinafter referred to as a resin composition) and the resins used for the surface layer and carbon black (hereinafter referred to as a resin composition) as materials. For example, resin compositions for the substrate layer and for the surface layer are separately formed into sheets or films by separate extruders, and the sheets or films are stepwise laminated by a heat lamination method, a dry lamination method, an extrusion lamination method or the like, or on one side or on both sides of a preliminarily formed substrate layer sheet, a surface layer is laminated by extrusion coating or the like. Further, an electrically conductive sheet can be obtained also by a method of obtaining a laminated sheet by a multilayer coextrusion method using a multimanifold die or a feed block, and this method is preferred with a view to obtaining a laminated sheet in a single step.

The sheet of the present invention can be formed into shapes in accordance with purpose of use, by a known thermoforming method such as vacuum forming, pressure forming or press molding.

The sheet of the present invention can be suitably used as a packaging container for semiconductors such as IC or electronic components using IC.

EXAMPLES

Now, the present invention will be described in further detail with reference to Examples, but the present invention is by no means restricted to the following Examples.

Examples 1 to 15

Preparation of Substrate Layer and Surface Layer

A polycarbonate resin (Panlite L-1225, manufactured by TEIJIN CHEMICALS LTD.), a polybutylene terephthalate resin (NOVADURAN 5010R8M, manufactured by Mitsubishi Engineering-Plastics Corporation) and KETJENBLACK EC, manufactured by LION AKZO CO., LTD.) or acetylene black (DENKA BLACK granular, manufactured by Denki Kagaku Kogyo Kabushiki Kaisha) in a blend ratio as identified in Table 1 or 2 were melt kneaded by a twin screw extruder (PCM-40, manufactured by Ikegai) to obtain resin pellets. Further, using a multilayer sheet forming apparatus comprising one 65 mm single screw extruder for a substrate layer and two 40 mm single screw extruders for a surface layer, the resin composition for a substrate layer was melt kneaded by the 65 mm extruder, and the resin composition for a surface layer was melt kneaded by the 40 mm single screw extruders, and the resins were combined in a multimanifold die to prepare a three-layer sheet. The thickness of the obtained sheet was 200 μm, and the proportion of the surface layers was 20% on both sides (10% on one side).

Comparative Examples 1 to 5

A three-layer sheet was prepared in the same manner as in Examples 1 to 15 except that in addition to the polycarbonate resin and the polybutylene terephthalate resin, an ABS resin (SE-10, manufactured by Denki Kagaku Kogyo Kabushiki Kaisha), an ABS resin (SANTAC ET-70, manufactured by NIPPON A&L INC.), an HIPS resin (H700, manufactured by TOYO STYRENE CO., LTD.), an HIPS resin (HT516, manufactured by A&M Styrene Co., Ltd.) or SBR (TUFPRENE 125, manufactured by Asahi kasei Corporation) was blended in a blend ratio as identified in Table 3.

(Evaluation Methods)

Physical properties of sheets prepared in Examples and Comparative Examples were evaluated by the following methods, and the results are shown in Tables 1, 2 and 3. (Yield Strength, Breaking Strength, Modulus in Tension, Elongation at Break)

In accordance with JIS K7127 (1999), a tensile test was carried out at a tensile rate of 50 mm/min by an Instron tensile tester using a No. 4 test specimen (MD direction).

(Dupont Impact Strength)

Measured by DuPont type impact tester manufactured by Toyo Seiki Seisaku-sho, Ltd. using a ½ inch hemispherical impact base under loads of 500 g and 1 kg at a temperature of 23° C. The result was represented by the 50% impact fracture energy (unit: J) of JIS K7211.

(Evaluation of Molding Temperature)

Sheets were formed by a vacuum rotary type embossed carrier tape-forming machine (CTF-200, manufactured by CKD Corporation). On that occasion, the sheet surface temperature at which formation of a pocket is possible, was measured by using a thermolabel.

(Evaluation of Blanking Properties)

Each of perforations and center holes of an embossed carrier tape formed by a vacuum rotary type embossed carrier tape-forming machine (CTF-200, manufactured by CKD Corporation) was macrophotographed by an optical microscope (manufactured by MITSUTOYO CORPORATION), and the photographs were image-processed to digitize the incidence frequency of burrs and sink marks. As the digitizing method, the photographs are binarized by image processing software to count the number of pixels at the perforation. The proportion of the perforations covered with burrs and sink marks was calculated from the ratio of the number of pixels at the perforations of each sample to the number of pixels of a perfect circle having no burrs or sink marks formed at all to determine the incidence frequency.

(Evaluation of Slitting Properties)

Slitting was carried out by a ring combination blade of a vacuum rotary type embossed carrier tape-forming machine (CRF-200, manufactured by CKD Corporation), and the slit edge surface was observed by a microscope to confirm presence or absence of burrs and sink marks. Evaluation standards are such that one having substantially no burrs nor sink marks was rated to be excellent, one having burrs or sink marks with a length less than 0.5 mm was rated to be good, and one having burrs or sink marks with a length of 0.5 mm or longer was rated to be poor.

(Surface Resistivity of Molded Product)

Sheets were formed by a vacuum rotary type embossed carrier tape-forming machine (CTF-200, manufactured by CKD Corporation). The surface resistivity at the bottom of the molded product was measured using a surface resistance meter (manufactured by Mitsubishi Petrochemical Co., Ltd.) with a distance between electrodes of 10 mm.

TABLE 1

|  |  |  | Example | | | |
|---|---|---|---|---|---|---|
| Material | | Type | 1 | 2 | 3 | 4 |
| Composition of surface layer (mass %) | PC resin | L-1225 | 54 | 72 | 48 | 64 |
| | PBT resin | 5010R8M | 36 | 18 | 32 | 16 |
| | Carbon black | KETJENBLACK EC | 10 | 10 | | |
| | Carbon black | DENKA BLACK granular | | | | 20 |

TABLE 1-continued

|  |  |  |  |  |  |  |
|---|---|---|---|---|---|---|
| Composition of substrate layer (mass %) | PC resin | L-1225 | 57 | 76 | 57 | 76 |
|  | PBT resin | 5010R8M | 38 | 19 | 38 | 19 |
|  | Carbon black | DENKA BLACK granular |  | 5 |  |  |
| Physical properties | Yield strength (MPa) |  | 57.0 | 59.9 | 60.0 | 63.0 |
|  | Breaking strength (MPa) |  | 58.2 | 61.1 | 61.3 | 64.4 |
|  | Modulus in tension (MPa) |  | 2223 | 2334 | 2340 | 2457 |
|  | Elongation at break (%) |  | 138 | 135 | 135 | 118 |
|  | DuPont impact strength (J) |  | 3.5 | 3.4 | 3.4 | 3.2 |
|  | Molded product surface temperature (° C.) |  | 160-166 | 160-166 | 160-166 | 166-171 |
|  | Burr incidence ratio (%) |  | 2.68 | 2.95 | 2.55 | 2.81 |
|  | Slitting properties |  | Excellent | Excellent | Excellent | Excellent |
|  | Molded product surface resistivity (Ω) |  | $10^5$ | $10^5$ | $10^4$ | $10^4$ |

|  |  |  | Example | | | |
|---|---|---|---|---|---|---|
| Material | Type |  | 5 | 6 | 7 | 8 |
| Composition of surface layer (mass %) | PC resin | L-1225 | 54 | 72 | 48 | 64 |
|  | PBT resin | 5010R8M | 36 | 18 | 32 | 16 |
|  | Carbon black | KETJENBLACK EC | 10 |  |  |  |
|  | Carbon black | DENKA BLACK granular |  |  |  | 20 |
| Composition of substrate layer (mass %) | PC resin | L-1225 | 51 | 68 | 51 | 68 |
|  | PBT resin | 5010R8M | 34 | 17 | 34 | 17 |
|  | Carbon black | DENKA BLACK granular |  | 15 |  |  |
| Physical properties | Yield strength (MPa) |  | 59.4 | 62.3 | 62.5 | 65.6 |
|  | Breaking strength (MPa) |  | 54.2 | 56.9 | 57.0 | 59.9 |
|  | Modulus in tension (MPa) |  | 2451 | 2574 | 2580 | 2709 |
|  | Elongation at break (%) |  | 118 | 112 | 112 | 106 |
|  | DuPont impact strength (J) |  | 3.2 | 3.0 | 2.7 | 2.6 |
|  | Molded product surface temperature (° C.) |  | 166-171 | 166-171 | 166-171 | 171-177 |
|  | Burr incidence ratio (%) |  | 1.82 | 2.00 | 1.73 | 1.90 |
|  | Slitting properties |  | Excellent | Excellent | Excellent | Excellent |
|  | Molded product surface resistivity (Ω) |  | $10^5$ | $10^5$ | $10^4$ | $10^4$ |

TABLE 2

|  |  |  | Example | | | |
|---|---|---|---|---|---|---|
| Material | Type |  | 9 | 10 | 11 | 12 |
| Composition of surface layer (mass %) | PC resin | L-1225 | 54 | 72 | 48 | 64 |
|  | PBT resin | 5010R8M | 36 | 18 | 32 | 16 |
|  | Carbon black | KETJENBLACK EC | 10 |  |  |  |
|  | Carbon black | DENKA BLACK granular |  |  |  | 20 |
| Composition of substrate layer (mass %) | PC resin | L-1225 | 45 | 60 | 45 | 60 |
|  | PBT resin | 5010R8M | 30 | 15 | 30 | 15 |
|  | Carbon black | DENKA BLACK granular |  |  | 25 |  |
| Physical properties | Yield strength (MPa) |  | 61.5 | 64.5 | 64.7 | 67.9 |
|  | Breaking strength (MPa) |  | 53.5 | 56.2 | 56.3 | 59.1 |
|  | Modulus in tension (MPa) |  | 2983 | 3132 | 3140 | 3297 |
|  | Elongation at break (%) |  | 20 | 19 | 19 | 18 |
|  | DuPont impact strength (J) |  | 2.4 | 2.4 | 2.4 | 2.2 |
|  | Molded product surface temperature (° C.) |  | 182-188 | 182-188 | 182-188 | 188-193 |
|  | Burr incidence ratio (%) |  | 0.88 | 0.97 | 0.84 | 0.92 |
|  | Slitting properties |  | Excellent | Excellent | Excellent | Excellent |
|  | Molded product surface resistivity (Ω) |  | $10^5$ | $10^5$ | $10^4$ | $10^4$ |

|  |  |  | Example | | |
|---|---|---|---|---|---|
| Material | Type |  | 13 | 14 | 15 |
| Composition of surface layer | PC resin | L-1225 | 20 | 85 | 50 |
|  | PBT resin | 5010R8M | 65 | 10 | 20 |
|  | Carbon | KETJENBLACK |  | 5 |  |

TABLE 2-continued

| (mass %) | black Carbon black | EC DENKA BLACK granular | | 15 | | 30 |
|---|---|---|---|---|---|---|
| Composition of substrate layer (mass %) | PC resin PBT resin Carbon black | L-1225 5010R8M DENKA BLACK granular | | 25 65 10 | 85 10 5 | 50 20 30 |
| Physical properties | Yield strength (MPa) | | | 54.8 | 58.6 | 68.8 |
| | Breaking strength (MPa) | | | 52.6 | 59.1 | 66.9 |
| | Modulus in tension (MPa) | | | 1853 | 2321 | 3402 |
| | Elongation at break (%) | | | 72 | 148 | 11 |
| | DuPont impact strength (J) | | | 2.2 | 3.3 | 1.8 |
| | Molded product surface temperature (° C.) | | | 160-166 | 166-171 | 216-224 |
| | Burr incidence ratio (%) | | | 3.97 | 3.64 | 1.06 |
| | Slitting properties | | | Excellent | Excellent | Excellent |
| | Molded product surface resistivity (Ω) | | | $10^{10}$ | $10^{10}$ | $10^{3}$ |

TABLE 3

| | | | Comparative Example | | | | |
|---|---|---|---|---|---|---|---|
| | Material | Type | 1 | 2 | 3 | 4 | 5 |
| Composition of surface layer (mass %) | PC resin PBT resin Carbon black HIPS resin HIPS resin SBR | L-1225 5010R8M DENKA BLACK granular H700 HT516 TUFPRENE 125 | 20 80 | 80 20 | 15 70 15 | 90 4 6 | 60 39 1 |
| Composition of substrate layer (mass %) | PC resin PBT resin Carbon black ABS resin ABS resin HIPS resin HIPS resin | L-1225 5010R8M DENKA BLACK granular SE-10 ET-70 H700 HT516 | 100 | 100 | 15 70 15 | 90 4 6 | 60 39 1 |
| Physical properties | Yield strength (MPa) | | 44.2 | 59.4 | 55.4 | 53.5 | 55.8 |
| | Breaking strength (MPa) | | 37.1 | 69.9 | 45.1 | 62.9 | 45.8 |
| | Modulus in tension (MPa) | | 1720 | 2120 | 2020 | 2332 | 2049 |
| | Elongation at break (%) | | 130 | 241 | 183 | 265 | 292 |
| | DuPont impact strength (J) | | 1.1 | 3.5 | 3.0 | 3.1 | 3.4 |
| | Molded product surface temperature (° C.) | | 138-143 | 232-241 | 171-177 | 223-232 | 216-224 |
| | Burr incidence ratio (%) | | 4.47 | 6.21 | 4.59 | 4.84 | 5.92 |
| | Slitting properties | | Poor | Poor | Poor | Poor | Poor |
| | Molded product surface resistivity (Ω) | | $10^{5}$ | $10^{5}$ | $10^{10}$ | — | — |

The sheet provided by the present invention has mechanical strength capable of coping with high speed packaging and mounting of electronic components, can be molded in a wide temperature region at a lower temperature side by various molding methods, and is capable of remarkably reducing formation of burrs and sink marks at the time of blanking and slitting.

INDUSTRIAL APPLICABILITY

The electrically conductive sheet of the present invention has excellent mechanical strength and is thereby suitable for high speed packaging and high speed mounting, and can be molded in a wide temperature region at a low temperature side. Further, it can remarkably reduce formation of dust at the time of blanking or the like, whereby electronic components will not be contaminated with scraps or the like, and thus the electrically conductive sheet of the present invention is applicable as an electronic component package with high precision.

The entire disclosure of Japanese Patent Application No. 2006-218418 filed on Aug. 10, 2006 including specification, claims and summary is incorporated herein by reference in its entirety.

The invention claimed is:

1. A sheet, comprising
    (a) a substrate layer comprising from 21 to 87 mass % of a polycarbonate resin, from 7 to 68 mass % of a polyalkylene terephthalate resin and from 15 to 30 mass % of carbon black, relative to 100 mass % of the substrate layer, and
    (a1) a first surface layer comprising from 19 to 86 mass % of a polycarbonate resin, from 6 to 67 mass % of a polyalkylene terephthalate resin and from 5 to 35 mass % of carbon black, relative to 100 mass % of the first surface layer, and,
    (a2) optionally, a second surface layer comprising from 19 to 86 mass % of a polycarbonate resin, from 6 to 67 mass % of a polyalkylene terephthalate resin and from 5 to 35 mass % of carbon black, relative to 100 mass % of the second surface layer, wherein the first surface layer (a1) is directly laminated on one side of the substrate layer (a) by a heat lamination method, a dry lamination method, co-extrusion or extrusion coating, and the optional second surface layer (a2) is directly laminated on the opposite side of the substrate layer (a) by a heat lamination method, a dry lamination method, co-extrusion or extrusion coating, wherein the sheet has a burr incidence ratio of at most 4%, and wherein each of the first surface layer (a1) and the optional second surface layer (a2) has a surface resistivity of from $10^2$ to $10^6 \Omega$.

2. The sheet of claim 1, wherein the polyalkylene terephthalate resin is polybutylene terephthalate.

3. The sheet of claim 1, which has a tensile elongation at break of from 10 to 150% as stipulated in JIS K6734 (2000).

4. The sheet of claim 1, which is produced by a co-extrusion method with a multimanifold die or a feed block.

5. A carrier tape, comprising the sheet of claim 1.

6. The sheet of claim 1, wherein the substrate layer (a) comprises
from 25 to 85 mass % of a polycarbonate resin,
from 10 to 65 mass % of a polyalkylene terephthalate resin, and
from 15 to 30 mass % of carbon black,
relative to 100 mass % of the substrate layer.

7. The sheet of claim 1, wherein the substrate layer (a) comprises
from 35 to 82 mass % of a polycarbonate resin,
from 10 to 49 mass % of a polyalkylene terephthalate resin, and
from 15 to 25 mass % of carbon black,
relative to 100 mass % of the substrate layer.

8. The sheet of claim 1, wherein the first surface layer (a1) comprises
from 32 to 81 mass % of a polycarbonate resin,
from 10 to 48 mass % of a polyalkylene terephthalate resin, and
from 10 to 25 mass % of carbon black,
relative to 100 mass % of the first surface layer.

9. The sheet of claim 1, wherein the second surface layer (a2) is present and comprises
from 32 to 81 mass % of a polycarbonate resin,
from 10 to 48 mass % of a polyalkylene terephthalate resin, and
from 10 to 25 mass % of carbon black,
relative to 100 mass % of the second surface layer.

10. The sheet of claim 1, wherein each of the first surface layer (a1) and the optional second surface layer (a2) is directly laminated on one side of the substrate layer (a) by a heat lamination method.

11. The sheet of claim 1, wherein each of the first surface layer (a1) and the optional second surface layer (a2) is directly laminated on one side of the substrate layer (a) by a dry lamination method.

12. The sheet of claim 1, wherein each of the first surface layer (a1) and the optional second surface layer (a2) is directly laminated on one side of the substrate layer (a) by co-extrusion.

13. The sheet of claim 1, wherein each of the first surface layer (a1) and the optional second surface layer (a2) is directly laminated on one side of the substrate layer (a) by extrusion coating.

14. The sheet of claim 1, having a thickness of from 0.1 to 3.0 mm, wherein the first surface layer (a1) and the optional second surface layer (a2) have a thickness that is from 2 to 80% of the thickness of the entire sheet.

15. The sheet of claim 1, having a thickness of from 0.1 to 3.0 mm, wherein the first surface layer (a1) and the optional second surface layer (a2) have a thickness that is from 5 to 60% of the thickness of the entire sheet.

16. The sheet of claim 1, wherein the carbon black present in the first surface layer (a1) and in the optional second surface layer (a2) is present in an amount greater than an amount of carbon black in the substrate layer (a).

17. The sheet of claim 1, wherein
each of the first surface layer (a1) and the optional second surface layer (a2) has carbon black present therein in an amount of from 20 to 30 mass %, relative to 100 mass % of the first (a1) and optional second (a2) surface layer, respectively, and
the substrate layer (a) has carbon black present therein in an amount of from 5 to 15 to 30 mass %, relative to 100 mass % of the substrate layer (a).

18. The sheet of claim 1, wherein the second surface layer (a2) is present.

19. The sheet of claim 1, wherein the second surface layer (a2) is present, and
wherein each of the first surface layer (a1) and the second layer (a2) has a surface resistivity of from $10^2$ to $10^6 \Omega$.

20. A sheet, comprising
(a) a substrate layer comprising from 25 to 85 mass % of a polycarbonate resin, from 10 to 65 mass % of a polyalkylene terephthalate resin and from 15 to 30 mass % of carbon black, relative to 100 mass % of the substrate layer (a), and
(a1) a first surface layer comprising from 20 to 85 mass % of a polycarbonate resin, from 10 to 65 mass % of a polyalkylene terephthalate resin and from 5 to 30 mass % of carbon black, relative to 100 mass % of the first surface layer (a1), and
(a2) a second surface layer comprising from 20 to 85 mass % of a polycarbonate resin, from 10 to 65 mass % of a polyalkylene terephthalate resin and from 5 to 30 mass % of carbon black, relative to 100 mass % of the second surface layer (a2),
wherein the first surface layer (a1) is present on and in contiguous contact with one side of the substrate layer (a) and deposited thereon by a heat lamination method, a dry lamination method, co-extrusion or extrusion coating,
wherein the second surface layer (a2) is present on and in contiguous contact with the opposite side of the substrate layer (a) and deposited thereon by a heat lamination method, a dry lamination method, co-extrusion or extrusion coating,
wherein the sheet has a burr incidence ratio of at most 4%,
wherein the sheet has thickness of from 0.1 to 3.0 mm,
wherein the first surface layer (a1) and the second surface layer (a2), have a thickness that is from 2 to 80% of the thickness of the entire sheet,
wherein the first surface layer (a1) and the second surface layer (a2) have a surface resistivity of from $10^2$ to $10^6 \Omega$.

* * * * *